United States Patent
Sung et al.

(10) Patent No.: US 8,094,547 B2
(45) Date of Patent: Jan. 10, 2012

(54) ORTHOGONAL FREQUENCY AND CODE HOPPING MULTIPLEXING COMMUNICATIONS METHOD

(75) Inventors: Dan-keun Sung, Daejon (KR); Young-ik Seo, Daejon (KR); Bang-chul Jung, Seoul (KR); Sung-ho Moon, Gyeonggi-do (KR); Jae-hoon Chung, Daejon (KR); Young-jun Hong, Seoul (KR); Jun-su Kim, Daejon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 1164 days.

(21) Appl. No.: 11/721,168

(22) PCT Filed: Dec. 8, 2005

(86) PCT No.: PCT/KR2005/004206
§ 371 (c)(1),
(2), (4) Date: Jun. 8, 2007

(87) PCT Pub. No.: WO2006/062368
PCT Pub. Date: Jun. 15, 2006

(65) Prior Publication Data
US 2010/0165952 A1 Jul. 1, 2010

(30) Foreign Application Priority Data
Dec. 8, 2004 (KR) .......................... 10-2004-0103205

(51) Int. Cl.
*H04J 11/00* (2006.01)
(52) U.S. Cl. ........................................................ 370/208
(58) Field of Classification Search .................. 370/208, 370/203, 535, 537, 539, 532
See application file for complete search history.

(56) References Cited

U.S. PATENT DOCUMENTS
6,856,590 B2 * 2/2005 Okada et al. .................. 370/208

FOREIGN PATENT DOCUMENTS
KR 2001-0016948 3/2001
* cited by examiner

*Primary Examiner* — Brenda H Pham
(74) *Attorney, Agent, or Firm* — Bachman & LaPointe, P.C.

(57) ABSTRACT

An Orthogonal Frequency and Code Hopping Multiplexing (OFCHM) communication method based Orthogonal Frequency Division Multiplexing (OFDM) in a wireless communication system in which a plurality of communication channels are synchronized through a single medium. Six types of spreading and hopping methods are included, a method of controlling spreading and hopping depending on channel states, and a method of determining whether radio resources, consisting of subcarriers and orthogonal codewords, are allocated in a hopping manner according to the quality of service in the OFCHM communication method based OFDM. Furthermore, an embodiment employing six multiple array antennas is included. For this purpose, a method of combining a collision comparator and controller for monitoring the operations of a subcarrier group hopping pattern generator and an orthogonal code hopping pattern generator, a multiplexer and data symbol mapper, and the collision of hopping patterns that are composed of subcarriers and orthogonal codewords, and comparing data symbols to be transmitted to second communication stations to determine whether the data symbols collide in a symbol interval, a beam-forming processor for managing the operation of multiple array antennas, and a weighting vector controller is proposed.

9 Claims, 13 Drawing Sheets

ORTHOGONAL FREQUENCY AND CODE HOPPING MULTIPLEXING COMMUNICATIONS METHOD

TECHNICAL FIELD

The present invention relates to a method of multiplexing a plurality of communication channels, and controlling spreading, hopping and the assignment of radio resources at the time of multiplexing to implement an orthogonal frequency and code hopping multiplexing communication method based on an orthogonal frequency division multiplexing method, in a communication system in which a plurality of communication channels are temporally synchronized.

Particularly, the present invention relates to, in a communication system based on an orthogonal frequency division multiplexing method, having a plurality of second communication stations synchronized with the first communication station, 1) a method of a first communication station assigning orthogonal channels with subcarrier groups and orthogonal codewords to second communication stations and discriminating the assigned orthogonal channels using pseudo-random hopping patterns in orthogonal frequency and code hopping multiplexing, 2) a method of not transmitting data symbols with a symbol collision during a corresponding data symbol interval and applying a collision compensation method that increases the transmission power of all channels, in order to compensate for partially lost data of all related channels, in the case where multiple channels use the same orthogonal subcarrier group and orthogonal codeword and all the related data symbols do not have an identical symbol value, 3) a method of adjusting a spreading method and a hopping method according to varying channel environments, distances, and relative velocities between the first and second communication stations, and 4) a method of combining and using a division method (dedicated resource allocation) and a hopping method according to the quality of service desired by each channel when the above hopping method is combined with a conventional non-hopping type division method based on dedicated resource allocation and is then used.

BACKGROUND ART

The base system of the present invention employs an Orthogonal Frequency Division Multiplexing (OFDM) method. The transmission data assigned to each channel is temporally divided and then transmitted, and since the transmission intervals of OFDM symbols are increased through a serial/parallel converter, the effect of multiple paths can be reduced.

FIG. 1 is a transmission block diagram based on Orthogonal Frequency Division Multiplexing (OFDM). Data streams to be transmitted to the respective second communication stations are converted through channel encoders 101, 104 and 107. The above channel-encoded symbols, respectively, pass through interleavers 102, 105 and 108 and are then modulated by data modulation blocks 103, 106 and 109. The transmission time of data that have undergone data modulation is determined through a Time-Division Multiplexing (TDM) block 110, and a selected data symbol stream is carried on an OFDM-based subcarrier along with pilot information 111. A process of carrying the data symbol stream on the subcarrier is performed through a serial/parallel converter 112, an Inverse Fast Fourier Transform (IFFT) block 113, and a parallel/serial converter 114. A Cyclic prefix 115 for eliminating the interference between adjacent subcarriers, and the interference between adjacent OFDM symbols is inserted into the OFDM symbols that have passed through the parallel/serial converter 114, and the resulting OFDM symbols are transmitted through a transmission block 117 via a digital-analog converter 116.

A multi-carrier spread spectrum system is a system in which a conventional Code Division Multiple Access (CDMA) method and the OFDM method are combined together. The second communication stations are respectively assigned unique orthogonal codewords, and spread and transmit transmission data using the assigned orthogonal codewords. The subcarriers used for transmission are also assigned by the first communication station.

FIG. 2 is a transmission block diagram of a multi-carrier spread spectrum system. The overall procedure of converting respective data bit streams, to be transmitted to second communication stations, up to data modulation blocks 203, 206 and 209, is the same as those of the orthogonal frequency division multiplexing method shown in FIG. 1. Data that have undergone data modulation is multiplied by an orthogonal codeword from an orthogonal code generator 210, and each of the respective data symbol streams to be transmitted to the second communication stations is assigned a transmission time and a subcarrier to be used at the time of transmission through a multiplexer and data symbol mapper 211. The subsequent processes are the same as those described in FIG. 1.

In the multi-carrier spread system, the data symbol streams in FIG. 2 are classified into three types according to the operation of the multiplexer and data symbol mapper 211.

FIGS. 3, 4 and 5 show examples of the three operations of the multiplexer and data symbol mapper.

In FIG. 3, data symbol mapping is performed such that data symbol streams 304, 305, 306 and 307 respectively multiplied by orthogonal codewords are arranged along a frequency axis 302 and are transmitted. In a subcarrier group 309 assigned according to the size of a orthogonal codeword (for example: $N_c$=8), the respective data symbol streams to the second communication stations are multiplexed on an orthogonal code axis 301 and are transmitted. In this case, a data symbol stream, which is spread using a single orthogonal codeword, is mapped to be transmitted for an OFDM symbol interval 308, that is, for a symbol time interval of $T_s$. Since the system has $N_{sub}$ subcarriers in total, there exist [$N_{sub}/N_c$] subcarrier groups.

In FIG. 4, data symbol mapping is performed such that data symbol streams 404, 405, 406 and 407, respectively multiplied by orthogonal codewords, are arranged on a time axis 403 and then transmitted. The data symbol streams use only a single subcarrier, and are multiplexed along an orthogonal code axis 401 so as to be transmitted for $N_c$ (for example: $N_c$=8) OFDM symbol intervals 408, that is, for a symbol time interval of Ts. Since FIG. 4 shows an example of a case for $N_c$=8, the transmission of data symbol streams is performed during 8 symbol intervals.

In FIG. 5, data symbol mapping is performed such that data symbol streams 504, 505, 506 and 507, respectively multiplied by orthogonal codewords, are arranged on both of a frequency axis 502 and a time axis 503 and then transmitted. The data symbol streams are multiplexed on an orthogonal code axis 501 so as to be transmitted for $N_t$ (for example: $N_t$=4, 510) OFDM symbol time intervals Ts 508, in a single subcarrier group 511 that is composed of $N_f$ subcarriers 509. The size of the orthogonal codeword assigned to the system is $N_c$, so that $N_c$ is equal to the multiplication of a spreading factor $N_f$ 510 in the frequency axis and a spreading factor $N_t$ 509 in the time axis. In the system, the total number of subcarriers is $N_{sub}$, and there exist, $[N_{sub}/N_f]$ subcarrier groups.

DISCLOSURE

Technical Problem

The conventional orthogonal resource division multiplexing methods assign pre-determined orthogonal codewords and subcarrier groups to the first communication station and multiplex data symbol streams to be transmitted to a plurality of the second communication stations, regardless of the activity factor of a channel connected at the time of establishment of a new call, and release the assigned orthogonal codewords and the subcarrier groups at the time of termination of the call and allow other second communication stations to use them. Accordingly, in the case where the activity factor of the channel is low, like bursty packet data, the orthogonal resource division multiplexing method assign a channel in a dedicated manner, and thus, a problem of channel inefficiency due to an increase in the unused intervals.

Furthermore, a conventional communication method based on a FH-OFDM (Frequency-Hopping OFDM) performs communication using frequency hopping patterns pre-determined between the first and second communication stations at the time of establishment of a new call, and determines the first communication station to be assigned according to the number of previously assigned channels. However, this conventional communication methods do not consider any change in assigning the hopping patterns of orthogonal codewords and subcarrier groups according to varying communication environments, and do not have a control function, such as a function of not transmitting the corresponding data symbol of the related channel to reduce the possibility of errors in a channel decoder when collisions among orthogonal codewords occur within each OFDM-type subcarrier group.

Technical Solution

Accordingly, the present invention has been made in order to solve the above problems occurring in the prior art, and the first objective of the present invention is to provide a method that includes both multiplexing and data symbol mapping in the above-described multi-carrier spread spectrum system, and to achieve a statistical multiplexing gain by allowing respective channels to perform hopping on combinations of subcarrier groups and orthogonal codewords, and thus, to accommodate a number of channels greater than that obtained from combinations of given subcarrier groups and orthogonal codewords.

The second objective of the present invention is to provide a method to reduce multi-path loss, and to compensate for channel variations using a simple single-tap equalizer at the receiver because the system inherits the characteristics of the OFDM-based transmission system.

The third objective of the present invention is to provide a method that inherits a conventional CDMA and averages interference from adjacent cells through a despreading process at the receiver, and thus, prevents an abrupt increase in the transmission power of the system.

The fourth objective of the present invention is to provide a method to improve the conventional inefficient usage of radio resources in packet communications by orthogonal resource hopping of both subcarrier groups and orthogonal codewords where data symbol streams are transmitted to second communication stations.

The fifth objective of the present invention is to provide a method to efficiently reduce scheduling complexity and control overhead in accommodating many medium- and low-rate users through hopping patterns that are previously assigned between the first and second communication stations without additional control information during sessions.

The sixth objective of the present invention is to provide a method to allocate the required number of subcarrier groups and the required number of orthogonal codewords and to assign a hopping pattern according to the desired transmission rate and the desired delay requirement of each second communication station, the distances between the first and second communication stations, the importance of an assignment channel, and the number of second communication stations in the system. Thus, this method can improve the performance of OFCHM communication system.

Advantageous Effects

The present invention based on an OFCHM method performs spreading using orthogonal codewords, the assignment of spread data symbols to a subcarrier, hopping onto the subcarrier axis and orthogonal code axis of spread data symbol groups, and thus, it enables the assignment of a relatively large number of channels from the first communication station to the second communication stations, compared to the conventional methods.

Furthermore, the present invention not only succeeds the advantages of a conventional Orthogonal Code Hopping Multiplexing (OCHM), which performs hopping onto only an orthogonal code axis, but also additionally performs hopping onto a subcarrier axis, thus being capable of reducing the probability of collisions that occur at the time of hopping.

Furthermore, the present invention enables various types of multiplexing and transmission methods based on a spreading method and a hopping method. The methods may be adaptively used according to a given wireless channel environment.

Furthermore, the present invention changes the total spreading factor, spreading factors ($N_f$) over a subcarrier axis and spreading factors ($N_t$) over a time axis at the time of the assignment of spread data symbols to subcarriers and orthogonal codewords, and thus, it meets the quality of service (QoS) requirement and increases transmission efficiency, in consideration of the distances between the first and second communication stations, the number of multiple paths, and relative user mobility.

Furthermore, the present invention classifies the radio resources of the system, having subcarriers and orthogonal codewords, into two resource groups corresponding to the conventional orthogonal resource division mode and orthogonal resource hopping mode, and operates the resource groups, thus being capable of adaptively assigning the radio resources to the resource groups according to the characteristics of data. Accordingly, various channel situations and the second communication stations that request services different from each other station can be efficiently accommodated in the system. In particular, the present invention performs appropriate scheduling on second communication stations having characteristics different from each other on a frequency domain, and thus, it can achieve multiuser diversity. The present invention groups and manages subcarriers, and it can reduce the complexity of scheduling and adjust the data transmission rate of each of the second communication stations.

Furthermore, the present invention can increase the range of selections through a process of adjusting spreading factor values for an arbitrary second communication station using a characteristic in which collisions between symbols decrease at the time of the application of a beam-forming technique to an Orthogonal Frequency and Code Hopping Multiplexing (OFCHM) method.

DESCRIPTION OF REFERENCE NUMBER OF PRINCIPAL ELEMENTS

Figure 1:
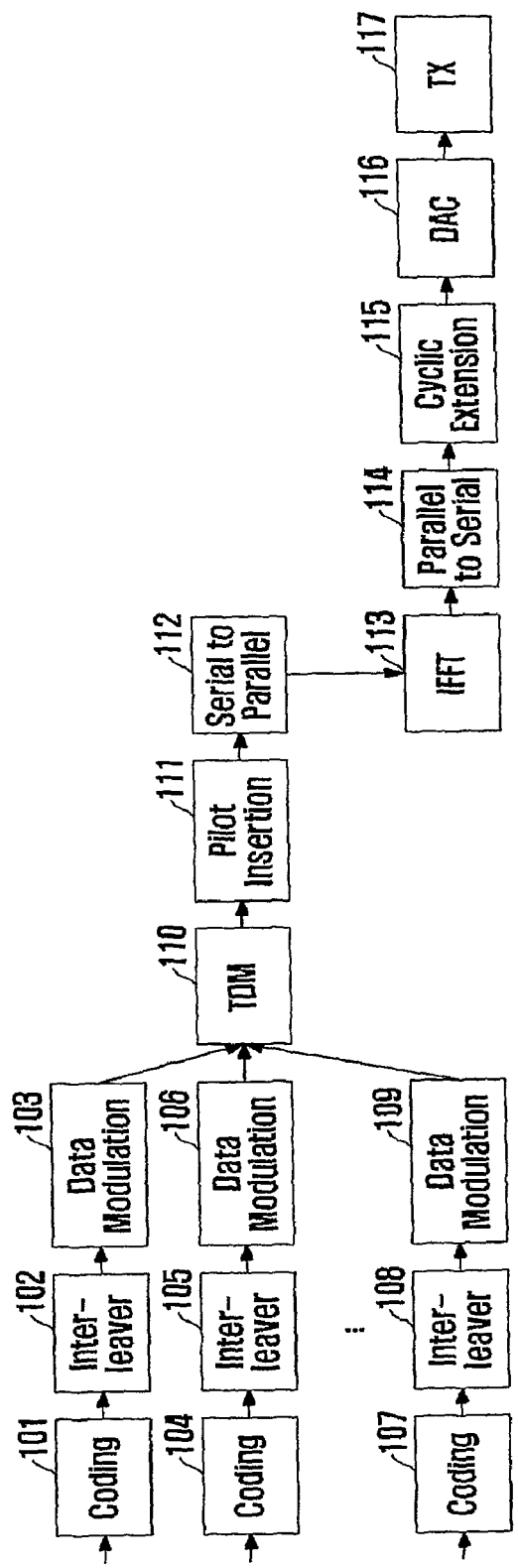
FIG. 1 is a conventional OFDM-based transmission block diagram.

601: coding block
602: interleaver
603: data modulation block
610: orthogonal code hopping pattern generator
611: subcarrier group hopping pattern generator
612: multiplexer and data symbol mapper
613: collision comparator and controller

BEST MODE

Figure 3:
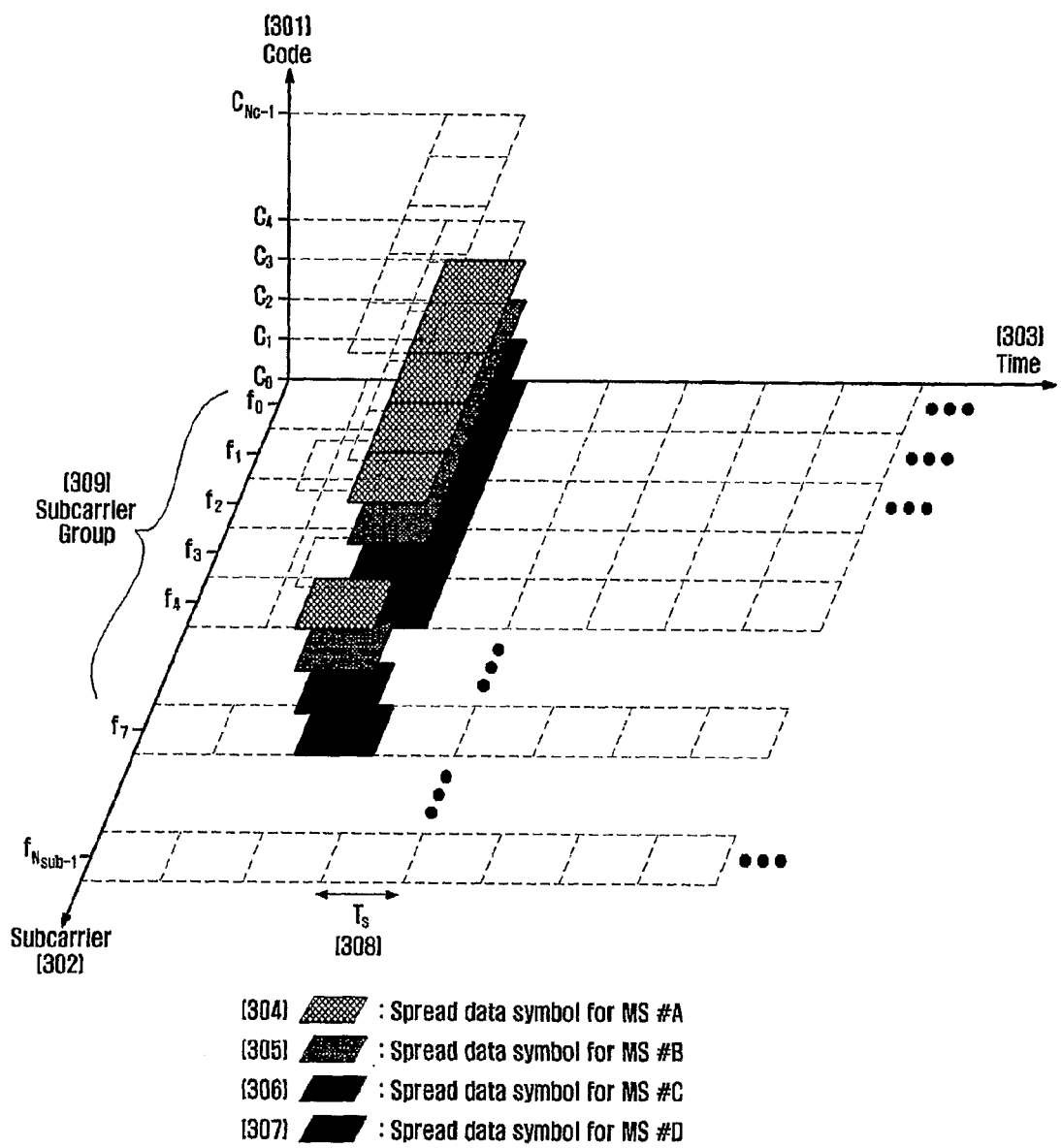
FIG. 3 is a diagram illustrating an example of operational methods of a multi-carrier spread spectrum system in which a multiplexer and data symbol mapper arranges data symbols only along a subcarrier axis.
Figure 4:
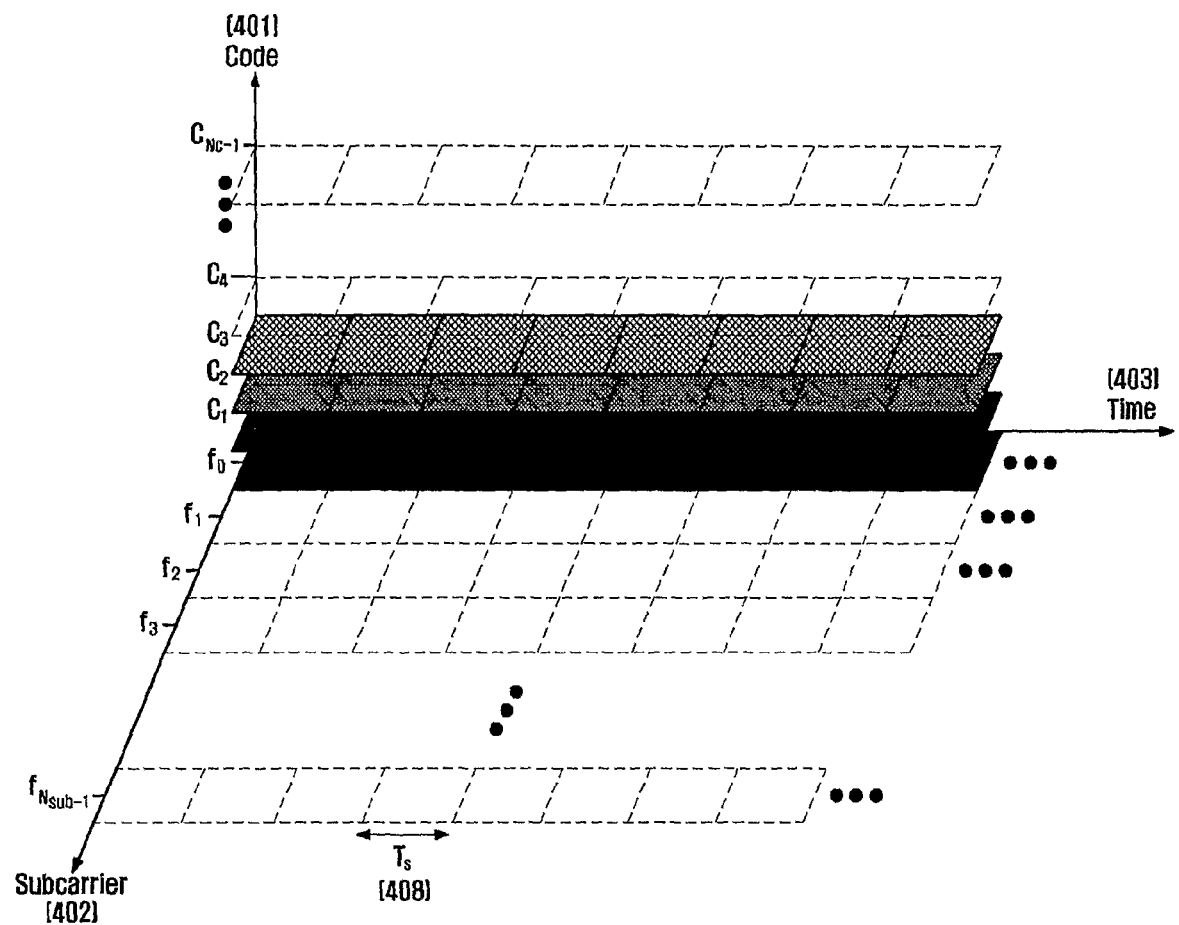
FIG. 4 is a diagram illustrating an example of operational methods of a multi-carrier spread spectrum system in which a multiplexer and data symbol mapper arranges data symbols only along a time axis.
Figure 5:
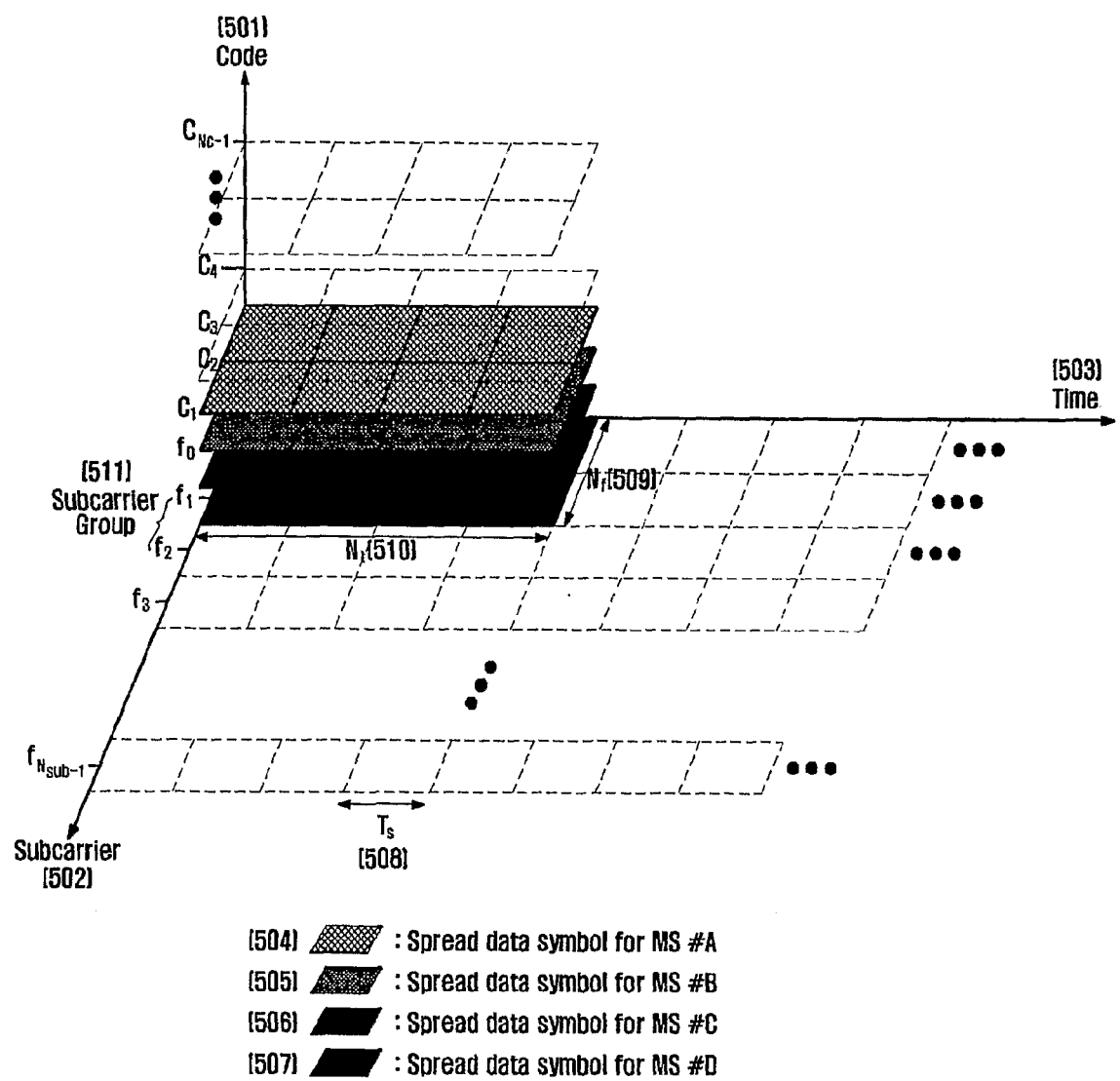
FIG. 5 is a diagram illustrating an example of operational methods of a multi-carrier spread spectrum system in which a multiplexer and data symbol mapper arranges data symbols along a subcarrier axis and a time axis.

The present invention allows a multi-carrier spread spectrum system to include all the multiplexing and data symbol mapping methods of FIGS. 3, 4 and 5, and relates to a method that allows respective channels to achieve a statistical multiplexing gain by performing hopping of combinations of subcarrier groups and orthogonal codewords, and can accommodate channels, the number of which is greater than that of combinations of given subcarrier groups and orthogonal codewords.

MODE FOR INVENTION

The construction and operation of the embodiments of the present invention are described in detail with reference to the accompanying drawings below.

A communication method based on OCHM selects an orthogonal codeword for each data symbol according to a first-dimensional hopping pattern predetermined between a first communication station and second communication stations and performs communication, and allows the first communication station to determine the total number of assigned channels in consideration of each activity factor of each channel, and compares the data symbols of channels involved in collisions that may occur in the case where first-dimensional hopping patterns, predetermined between the first communication station and the second communication stations, are independent of each other, transmits a corresponding symbol in the case where the data symbols are the same, but does not transmit the corresponding symbol by performing perforation (puncturing) in the case where the data symbols are not the same, and restores data symbols corresponding to a perforated (punctured) portion using a channel decoder at the receiver side (refer to Korean Appl. No. 10-1999-0032187, entitled "Orthogonal Code Hopping Multiplexing Communication Method And Apparatus"). The present invention is a statistical multiplexing method in which the orthogonal code hopping multiplexing method is extended to an OFDM method, and communication is performed using hopping of subcarrier groups and orthogonal codewords.

Figure 6:
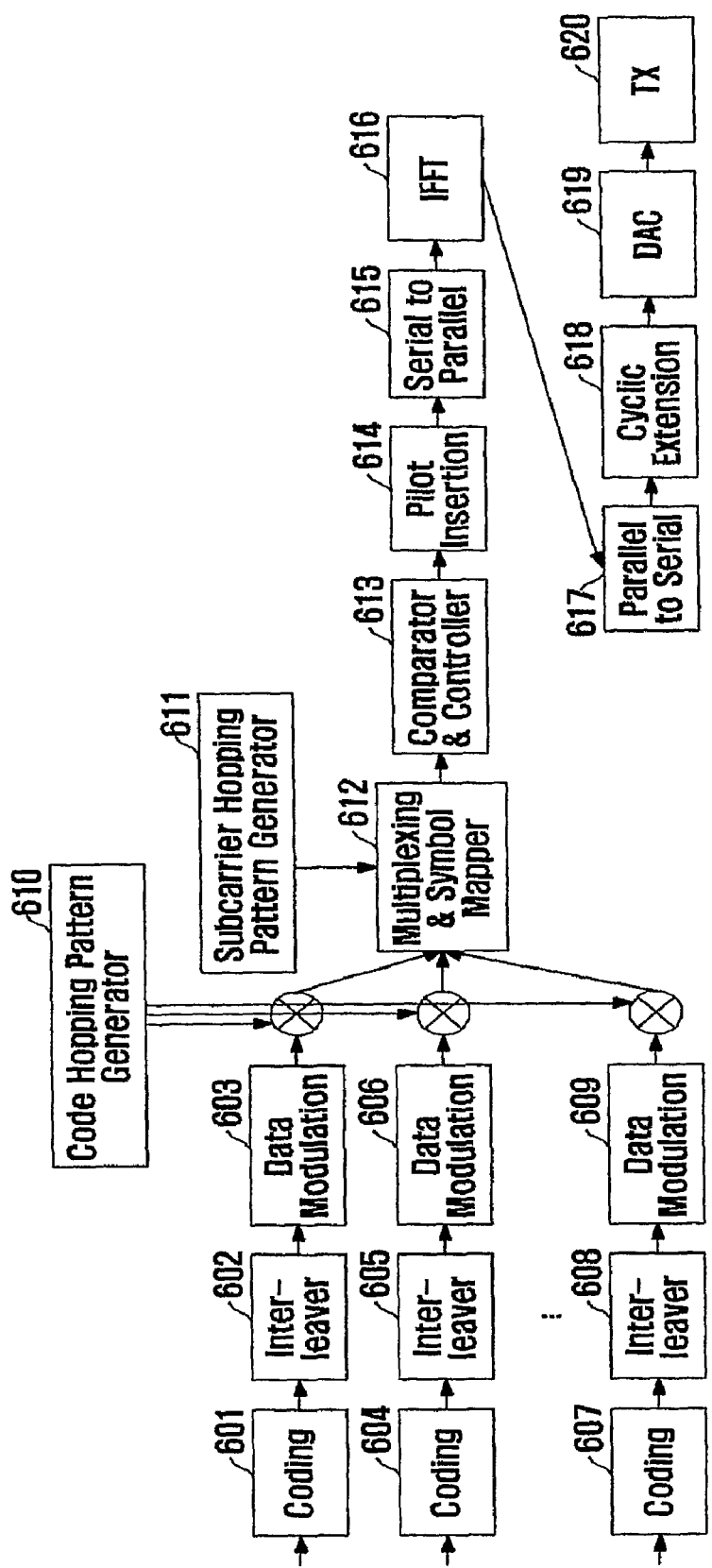
FIG. 6 is a transmission block diagram of an OFCHM method according to the present invention.

FIG. 6 illustrates a transmission block diagram of the present invention.

Figure 2:
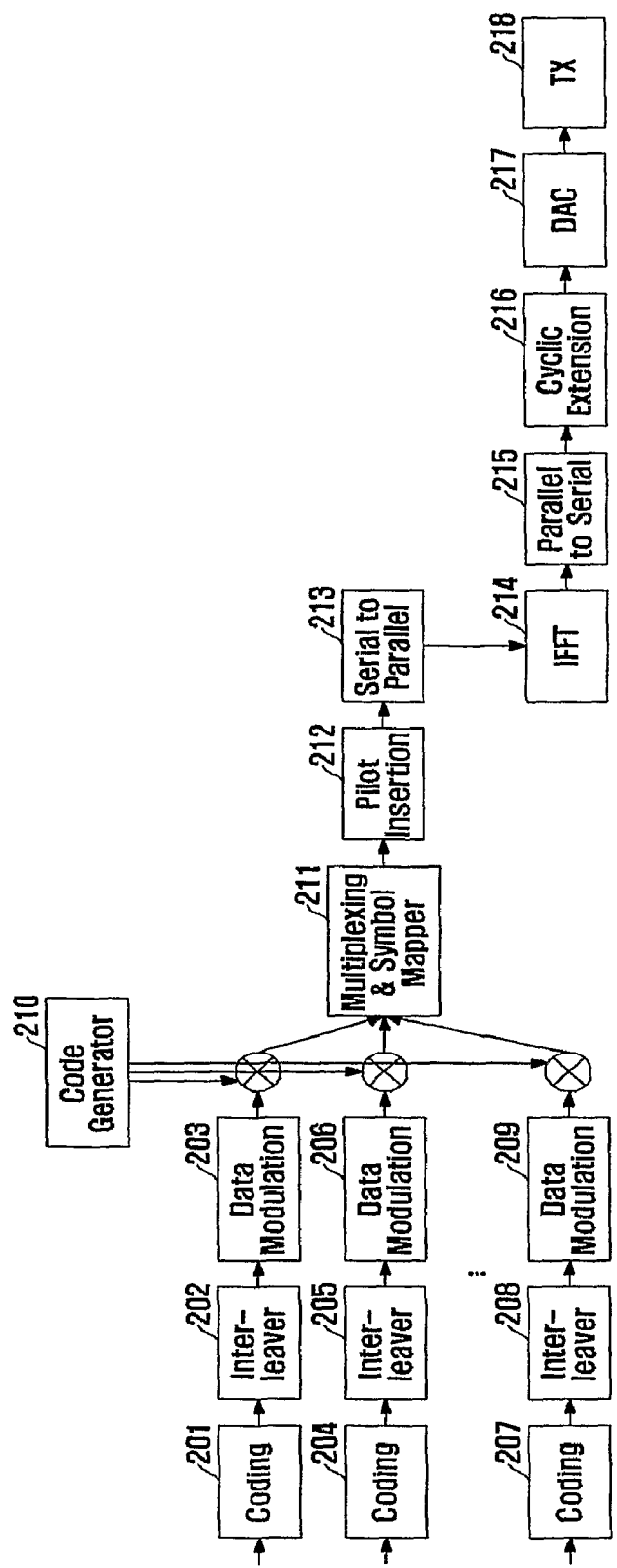
FIG. 2 is a conventional transmission block diagram of a multi-carrier spread spectrum system.

The operational processes of data modulation blocks 603, 606 and 609 are the same as the operational processes based on the multi-carrier spread spectrum method (FIG. 2). Data that have undergone data modulation are multiplied by an orthogonal codeword generated for each data symbol, and the orthogonal codeword is determined by an orthogonal code hopping pattern generator 610. Each data symbol stream multiplied by the orthogonal codeword is assigned a transmission time and a subcarrier group, to be used at the time of transmission, through a multiplexer and data symbol mapper 612. In this case, the subcarrier group to be used is determined every data symbol, and this determination is made by a subcarrier group hopping pattern generator 611.

For hopping sequences generated fro each symbol from both the orthogonal code hopping pattern generator 610 and the subcarrier group hopping pattern generator 611, respective data symbols transmitted to the second communication stations may collide with each other due to the assignment of the same orthogonal codeword and the same subcarrier group. The monitoring of the collisions are performed by a collision comparator and controller 613 located at the rear end of the multiplexer and data symbol mapper 612. After monitoring the collisions, the collision comparator and controller 613 compares the data values of colliding symbols. In this case, the collision comparator and controller 613 performs transmission without interruption when the colliding symbols have the same data value, and interrupts transmission for a collision data symbol interval when the colliding symbols do not have the same data value.

The operational processes up to blocks 614, 615, 616, 617, 618, 619 and 620 are the same as those in the OFDM method of FIG. 1.

Data symbol streams obtained by the multiplication of orthogonal codewords can be assigned to subcarriers as in the following three cases indicated by FIGS. 3, 4 and 5: the case where assignment is performed using only an orthogonal code axis; the case where assignment is performed using only a frequency axis; and the case where assignment is performed using both an orthogonal code axis and a frequency axis. Furthermore, methods of performing the hopping of the orthogonal codeword and the hopping of the subcarrier group can be classified into two cases.

Figure 7:
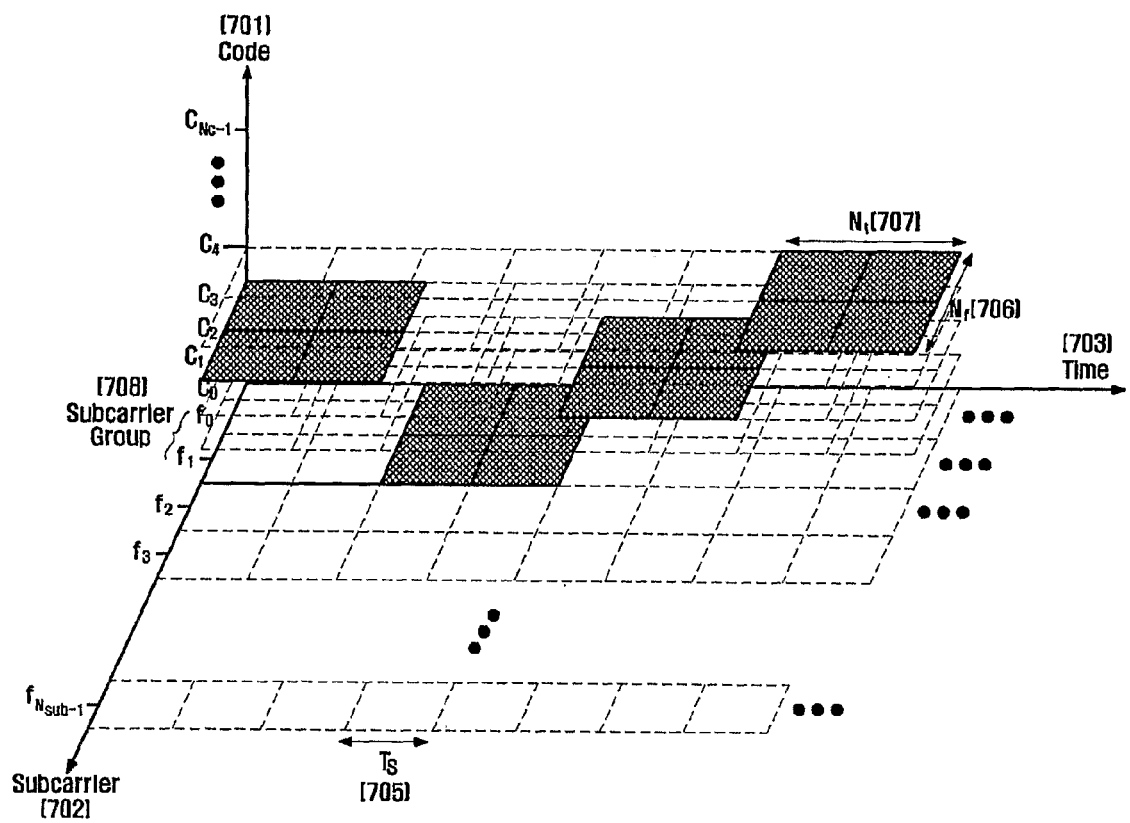
FIG. 7 is a diagram illustrating an example of operational methods in which hopping is performed only along a code axis, based on an OFCHM method.

FIG. 7 illustrates an example of a case where hopping is performed using only a code axis 701.

For ease of description, a situation in which there exists only a single second communication station 704, the total spreading factor $N_c$ is 4, and both a spreading factor $N_f$ 706 on a frequency axis 702 and a spreading factor $N_t$ 707 on a time axis 703 are 2. As can be seen from the present example, all data symbols for MS #A are assigned in a subcarrier group 708 that is composed of subcarriers $f_0$ and $f_1$, and each data symbol is transmitted using orthogonal codewords different from each other in two OFDM symbol intervals 705. In the present example, hopping is performed in order of orthogonal codewords $C_3$, $C_0$, $C_2$ and $C_4$.

Figure 8:
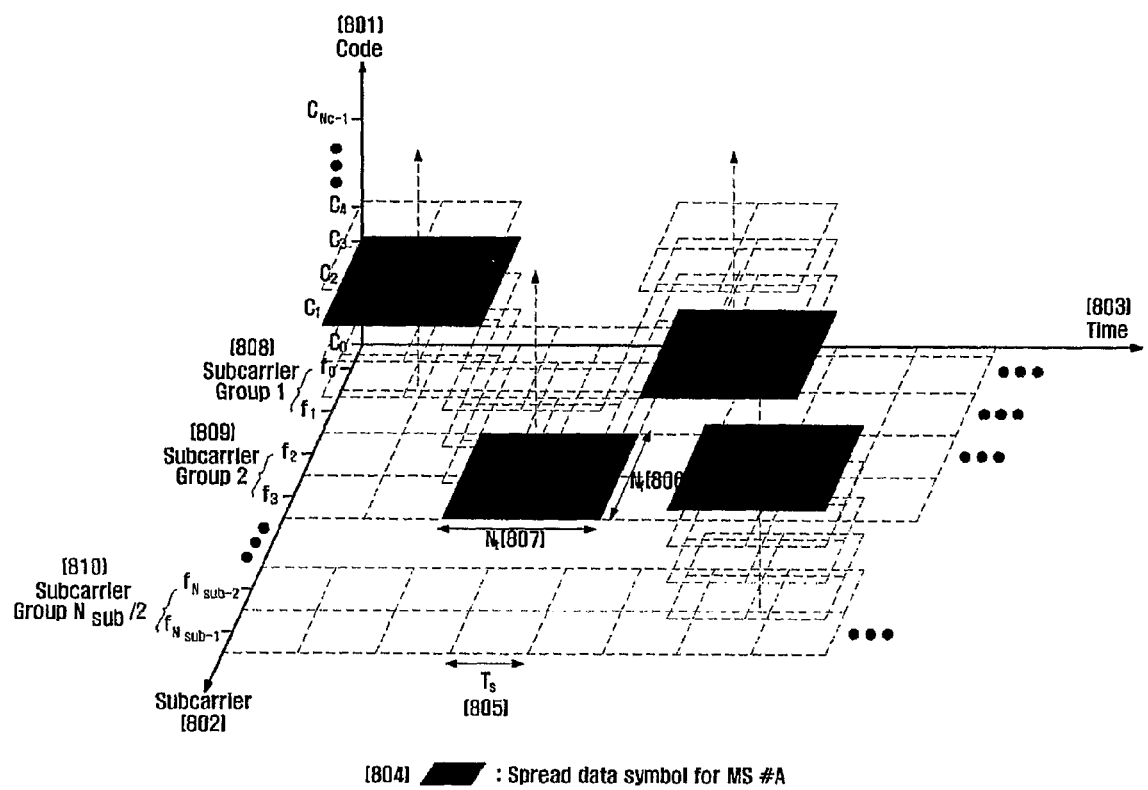
FIG. 8 is a diagram illustrating an example of operational methods in which hopping is performed only along a subcarrier axis and a code axis, based on an OFCHM method.

FIG. 8 illustrates an example of a case where hopping is performed using both a code axis 801 and a subcarrier axis 802. For ease of description, a situation in which there exists only a single second communication station 804, the total spreading factor $N_c$ is 4, and both a spreading factor $N_f$ 806 on a frequency axis 802 and a spreading factor $N_t$ 807 on a time axis 803 are 2. In the present example, hopping is performed in order of orthogonal codewords $C_3$, $C_0$, $C_1$ and $C_4$, and subcarrier hopping is performed in order of a subcarrier group one 808, a subcarrier group two 809, the subcarrier group one 808, and a subcarrier group $N_{sub/2}$ 810.

Accordingly, the OFCHM methods of the present invention can be classified into the following six cases:

Spreading in the time axis and hopping in the code axis
Spreading in the time axis and hopping in the both subcarrier and code axes
Spreading in the frequency axis and hopping in the code axis
Spreading in the frequency axis and hopping in the both subcarrier and code axes
Spreading in the both time and frequency axes and hopping in the code axis
Spreading in the both time and frequency axes and hopping in the both subcarrier and code axes In a given environment, different communication performance can be achieved according to the determination of the six types of spreading/hopping methods and according to the values of the spreading factors.

In a multiple cell structure, each second communication station is affected by interference attributable to the transmission of the first communication station adjacent thereto according to the distance between the first communication station and the second communication station, and this causes a great variation in the received signal-to-noise ratio of the second communication station. Accordingly, as the second communication station is more distant from the first communication station, it is advantageous to use larger spreading factor values for maintaining uniform communication quality. This allows the spreading factor $N_c$ to be adjusted in consideration of the distance between communication stations at the time of starting a call or during a session, in the OFCHM methods.

Variations in communication channels over the time axis are determined based on relative velocity between the first communication station and the second communication station. An increase in the relative velocity implies that the time characteristic of the channel varies fast, whereas a decrease in the relative velocity implies that the time characteristic of the channel varies slowly. Accordingly, the first communication station adjusts the spreading factor $N_t$ over the time axis at the time of starting a call or during a session in consideration of a relative velocity with the target second communication station, so that performance can be improved.

Variations in communication channels over the frequency axis are closely related to the number and features of multiple paths formed between the first communication station and the second communication stations. An increase in the number of multiple paths implies that the frequency characteristic of the channel varies fast, whereas a decrease of the number of multiple paths implies that the frequency characteristic of the channel varies slowly. Accordingly, the first communication station adjusts the spreading factor $N_f$ over the subcarrier axis at the time of starting a call or a session in consideration of the number and features of multiple paths with the target second communication station, so that performance can be improved.

Figure 9:
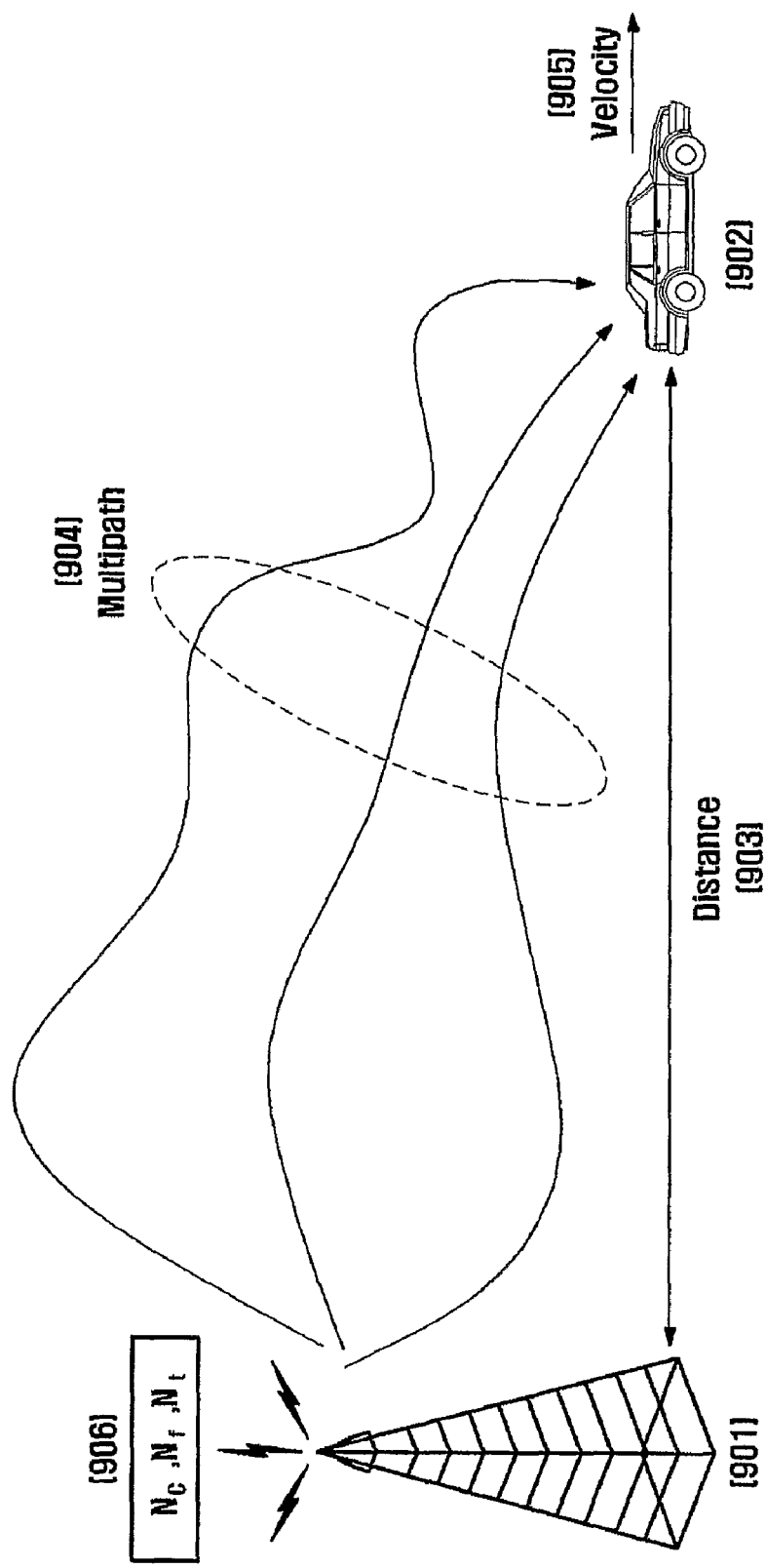
FIG. 9 is a conceptual diagram illustrating a method of determining and changing spreading and hopping methods based on distances, multiple paths, and relative velocity, based on an OFCHM method.

FIG. 9 is a conceptual diagram illustrating the case where the first communication station adjusts three parameters $N_c$, $N_f$ and $N_t$ 906 at the time of starting a call or during a session when multiplexing respective data symbol streams and assigning the multiplexed results to subcarriers, in consideration of the distance 903 between the first communication station 901 and the second communication station 902, the number and features of multiple paths 904, and the relative velocity 905.

As the location of the second communication station is more distant from that of the first communication station and is closer to the edge of a cell, the first communication station increases the spreading factors, so that it reduces interference attributable to adjacent cells, therefore maintaining a quality of service. Furthermore, when the velocity of the second communication station is relatively fast, the first communication station increases the spreading factors over the time axis, so that it obtains a diversity gain over the time axis, therefore maintaining a quality of service. Furthermore, when the number of multiple paths between the second communication station and the first communication station increases, the first communication station increases the spreading factors over the frequency axis, so that it obtains a diversity gain over the frequency axis, therefore maintaining a quality of service.

The OFCHM method of the present invention includes the conventional OFCDM (Orthogonal Frequency and Code Division Multiplexing) method that does not perform hopping. A non-hopping mode in which hopping is not performed can transmit data in a dedicated manner compared to a mode in which hopping is performed, and can acquire data transmission at the higher rate than a hopping mode, using a multiuser diversity in a scheduling method, but is disadvantageous in that a delay jitter characteristic is bad, compared with the hopping mode and less users can be supported.

A prospective communication system must accommodate high-speed data that must be supported by the conventional orthogonal resource division mode, and medium- and low-rate data that are supported by the hopping mode. For this purpose, the two modes may be combined for adaptive operation.

Figure 10:
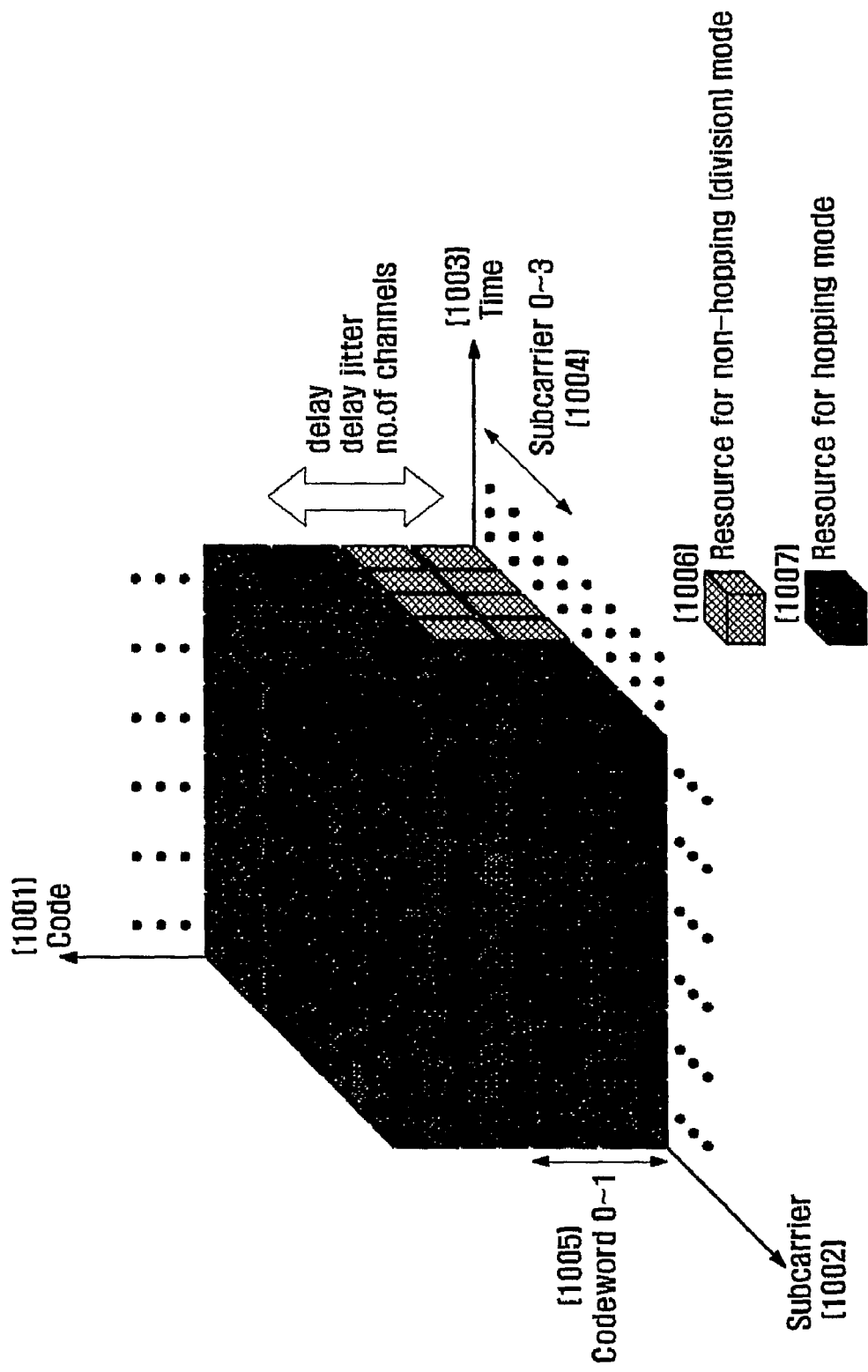
FIG. 10 is a conceptual diagram illustrating a method of operating radio resources while combining with a conventional orthogonal resource division method, and assigning radio resources to channels according to the quality of service required by each channel, based on an OFCHM method.

FIG. 10 illustrates an example of combining and using the two modes described above in the OFCHM method. Each of small blocks is a radio resource block that is composed of a single subcarrier, an OFDM symbol transmission interval, and a single orthogonal codeword. In the present example, a radio resource block 1006 that is composed of subcarriers 0 to 3 1004 and orthogonal codewords 0 and 1 1005 is assigned for operation of the division mode, the other radio resources blocks 1007 are assigned for operation of the hopping mode. The radio resource block 1006 assigned for the non-hopping (division) mode is assigned to an arbitrary second communication station in a fixed manner or is distributed to the second communication station through a scheduler in a time-division manner. The transmission efficiency of transmission data can be increased using an adaptive modulation method and an adaptive modulation and coding method at the time of scheduling. Furthermore, when scheduling is performed on the second communication stations so that a preferred subcarrier band for each second communication station can be used, the multiuser diversity gain for each second communication station can be maximized. In contrast, the radio resources 1007 assigned for the hopping mode is allocated based on six types of spreading/hopping methods in a range in which it does not occupy the area of the radio resource block assigned for the division mode.

When the two modes are combined and used, the determination of a resource group to be used at the time of multiplexing data symbol streams can be made according to the required delay characteristic of each data symbol stream. A data symbol stream for which a small delay is required is transmitted using anon-hopping (division) mode that is capable of supporting high-rate transmissions. In contrast, a data symbol stream for which relatively large delays are allowed is transmitted using a hopping mode resource group, so as to achieve a statistical multiplexing gain.

Furthermore, when the two modes are combined and used, the determination of resource groups to be used at the time of multiplexing data symbol streams can be made by the second communication station according to the required delay jitter characteristic of multiplexed data. A data symbol stream that can endure large delay jitters is transmitted using a resource group with the scheduling based division mode, and data that are sensitive to delay jitter are transmitted using a resource group based on the hopping mode, so as to achieve a statistical multiplexing gain.

Furthermore, when the two modes are combined and used, the determination of resource groups to be used at the time of multiplexing data symbol streams can be made according to the number of the second communication stations to be multiplexed. When there exist second communication stations whose number does not exceed $M_{th}$ given by a division mode resource group, the data symbol streams of all the second communication stations are transmitted as a division mode resource group. In contrast, when there exist second communication stations whose number exceeds $M_{th}$ given by a division mode resource group, only the data streams to a part of the second communication stations are transmitted as a division mode resource group, and the data streams of the other second communication stations are transmitted as a hopping mode resource group.

Furthermore, when the two modes are combined and used, the determination of resource groups to be used at the time of multiplexing data symbol streams can be made by the second communication stations according to the required bit error probability characteristic of data. Downlink data with a lower error probability requirement are assigned to the first division mode resource group, and data with a higher error probability requirement are assigned to the second hopping mode resource group.

Figure 11:
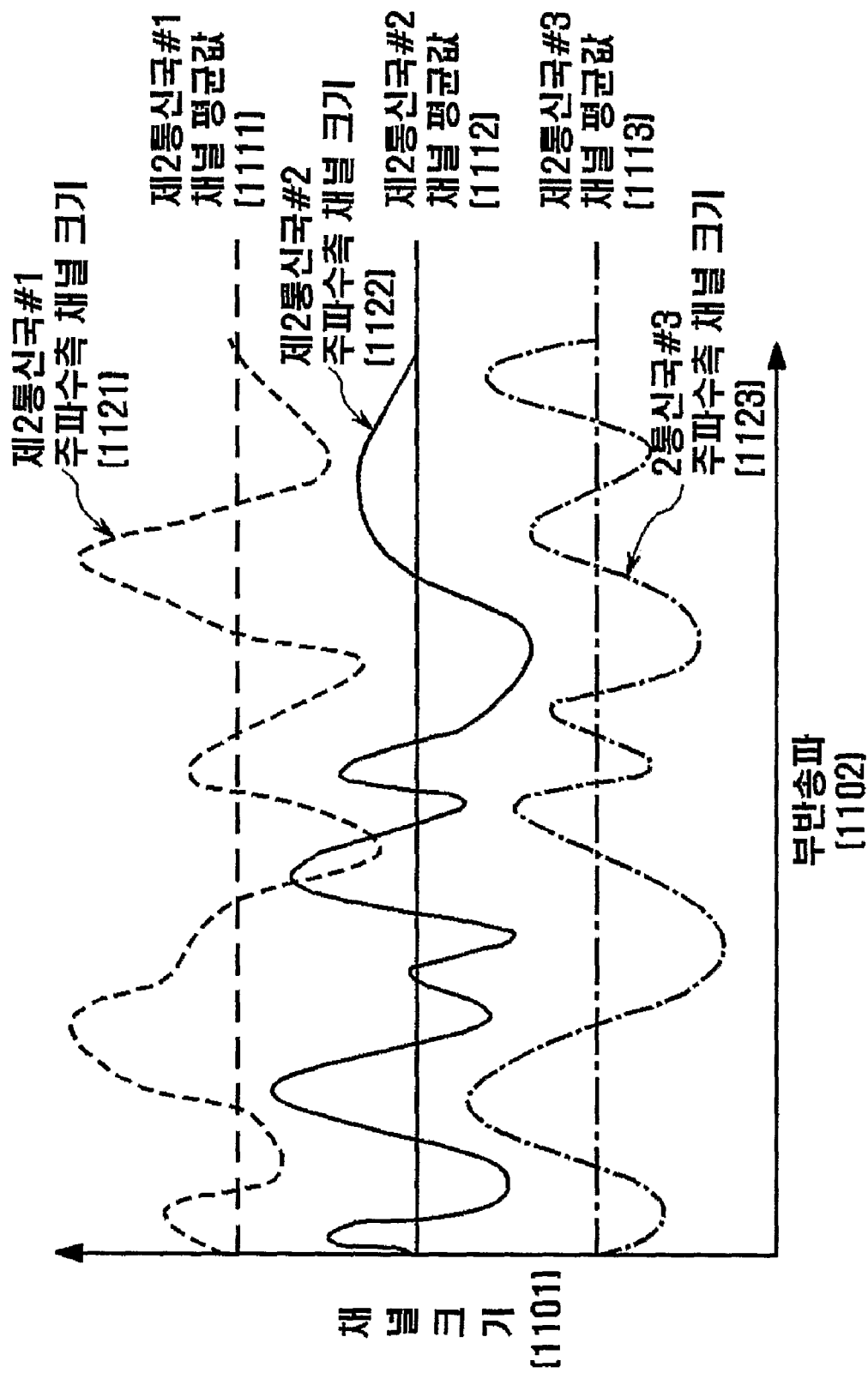
FIG. 11 is a conceptual diagram illustrating respective channel states for second communication stations.

FIG. 11 is a conceptual diagram illustrating respective channel states for second communication stations.

A second communication station 1113, the average value of the channel state 1101 of which is small (channels 1111 to 1113, in which the distance from the first communication station, and a shadow fading value, are considered), requires many radio resources, such as high power and a low channel coded rate, in contrast to other second communication stations, in order to maintain the same data transmission rate at the time of data communication. Accordingly, the second communication station is assigned a small amount of resources through assignment based on scheduling, but second communication stations 1112 and 1111 with good channel states, assign resources to the second resource group for multiplexing and hopping resources. Radio resources preferred by the second communication stations with poor channel states are first scheduled (multiuser diversity gain), so that the amount of radio resources that must be assigned to the second communication station having a poor channel state can be reduced. Furthermore, additional required energy that depends on orthogonal resource hopping collision generated at the time of assignment of resources to the second resource group is not needed, so that the performance of the entire system can be improved. The reason for this is because when resources are assigned to the second resource group in the second communication station with a poor channel quality due to its distant location from the first communication station, the additional required energy is much larger than the additional required energy when resources are assigned to the second resource group in the second communication station with a good channel quality. Furthermore, when scheduling is performed such that the second communication station with a poor channel state, it first selects preferred radio resources, all the second communication stations assign resources to the first resource group based on scheduling, the communication area managed by the first communication station can be extended and, at the same time, fairness among the second communication stations can be improved.

Furthermore, when, in the application of a scheduling algorithm, the second communication stations respectively measure and manage their own channel situations, for example, multiple path fadings 1121 to 1123, the second communication stations can respectively consider the frequency selective characteristics 1121 to 1123 in a frequency domain. The reason for this is because preferred frequency ranges can be different from each other when all the second communication stations are affected by independent multiple path fadings.

In an OFDM-based data communication system, when one subcarrier is assigned to each of the second communication stations, the data transmission rate is limited to the bandwidth of one subcarrier. Accordingly, the transmission rate is increased in such a way to group one or more subcarriers and to assign them to each of second communication stations. In the case where, even in the first resource management method based on scheduling, a number of subcarriers are respectively assigned to the second communication stations, and many frequency resources must be separately managed and, therefore, the complexity of scheduling becomes very high. Accordingly, it is efficient to manage a single subcarrier group that is formed by binding adjacent subcarriers. When, in the present invention, radio resources are managed based on the first method, a single subcarrier group is assigned, which includes a pre-determined number of subcarriers, not a single subcarrier assigned to each of the second communication stations, and the same modulation and channel coding can be applied to each group. In this case, modulation and coded rate is determined based on average, maximum, minimum, and harmonic average values of subcarrier channel sates in the group, which can represent the channel characteristic of the group. In this case, the channel characteristics of each group differs for each subcarrier even in the group, so that determination of the values representing the channel characteristic of a specific group affects the performance of the system. For example, when the modulation and coded rates are determined based on the maximum channel state of the subcarriers of each group, unexpected bit errors can occur, but the data transmission rate can be increased. In contrast, when the modulation and coded rates are determined based on the minimum channel state, errors occur at lower probabilities than the required bit error probability, but the data transmission rate is lowered in contrast to the former.

Figure 12:
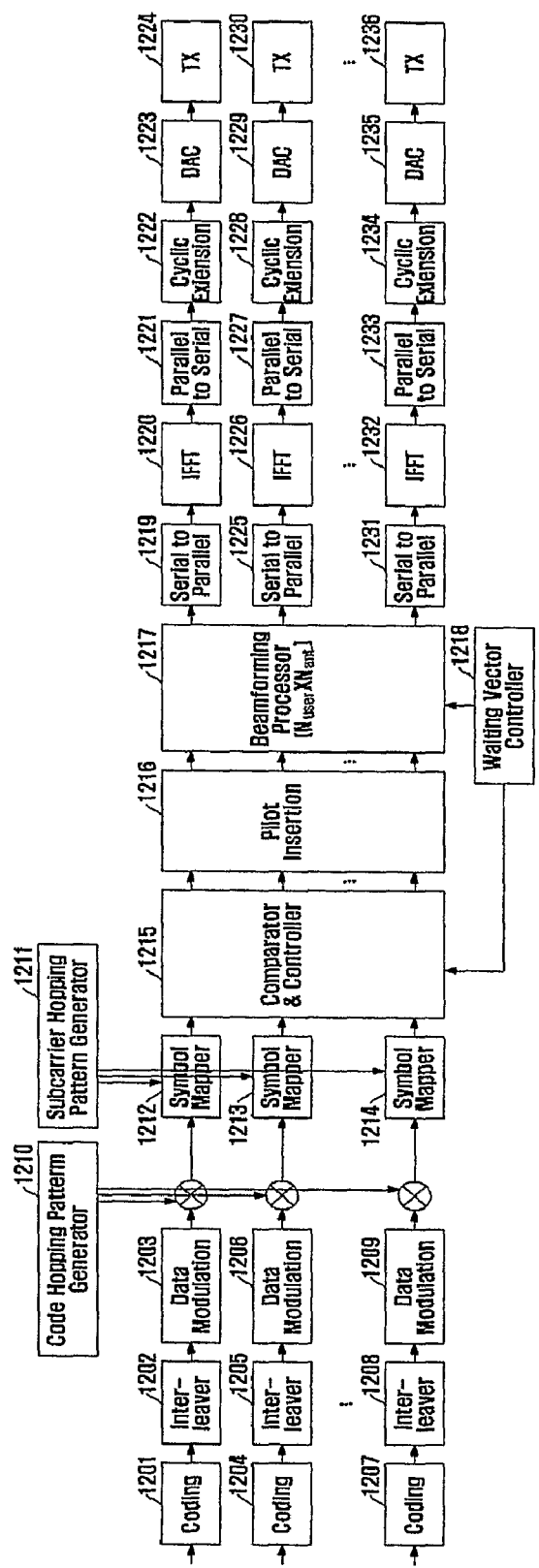
FIG. 12 is a transmission block diagram of the OFCHM method in which a beam-forming method using multiple array antennas is applied to respective user data streams.

FIG. 12 is a transmission block diagram of the OFCHM method in which a beam-forming method using multiple array antennas is applied to respective user data streams.

In the proposed OFCHM method based on OFDM method, beams can be formed using multiple array antennas so as to correspond to individual data streams to be transmitted in consideration of the locations of the second communication stations. In the present transmission block diagram, the processes up to symbol mappers 1212, 1213 and 1214 are the same as those in the OFCHM method (FIG. 6), except for a point in which, after code spread, subcarriers that have been assigned by a subcarrier group hopping pattern generator 1210, are assigned by the symbol mappers 1212, 1213 and 1214 without multiplexing individual data symbol streams. A collision comparator and controller 1215 determines whether a symbol collision occurs for each data symbol stream through comparison between codewords and subcarrier groups assigned by the code hopping pattern generator 1210 and a subcarrier group hopping pattern generator 1211, respectively, in each symbol interval and comparison between the locations of the second communication stations, which will respectively receive data streams acquired by a weighting vector controller 1217, and performs a corresponding symbol control. Thereafter, pilot symbols are added by a block 1216. The data streams are received by a beam-forming processor 1217, respectively are fed into the physical antennas of a phase array antenna to form beams toward the locations of the second communication stations, and the required signal processing is done in frequency domain for phase assignment. In this case, a phase weighting vector, which is formed based on the location of each user, is generated by a weighting vector controller 1218, and is used by the beam-forming processor 1217. The beam-forming processor 1217 performs operations to form selective or active beams with respect to a fixed beam based on a beam-forming technique. Furthermore, for pilot symbols other than the data streams, omni-directional beams are formed. Processes 1219 to 1224 performed by a physical antenna interface are the same as those in the OFCHM method of FIG. 6.

Figure 13:
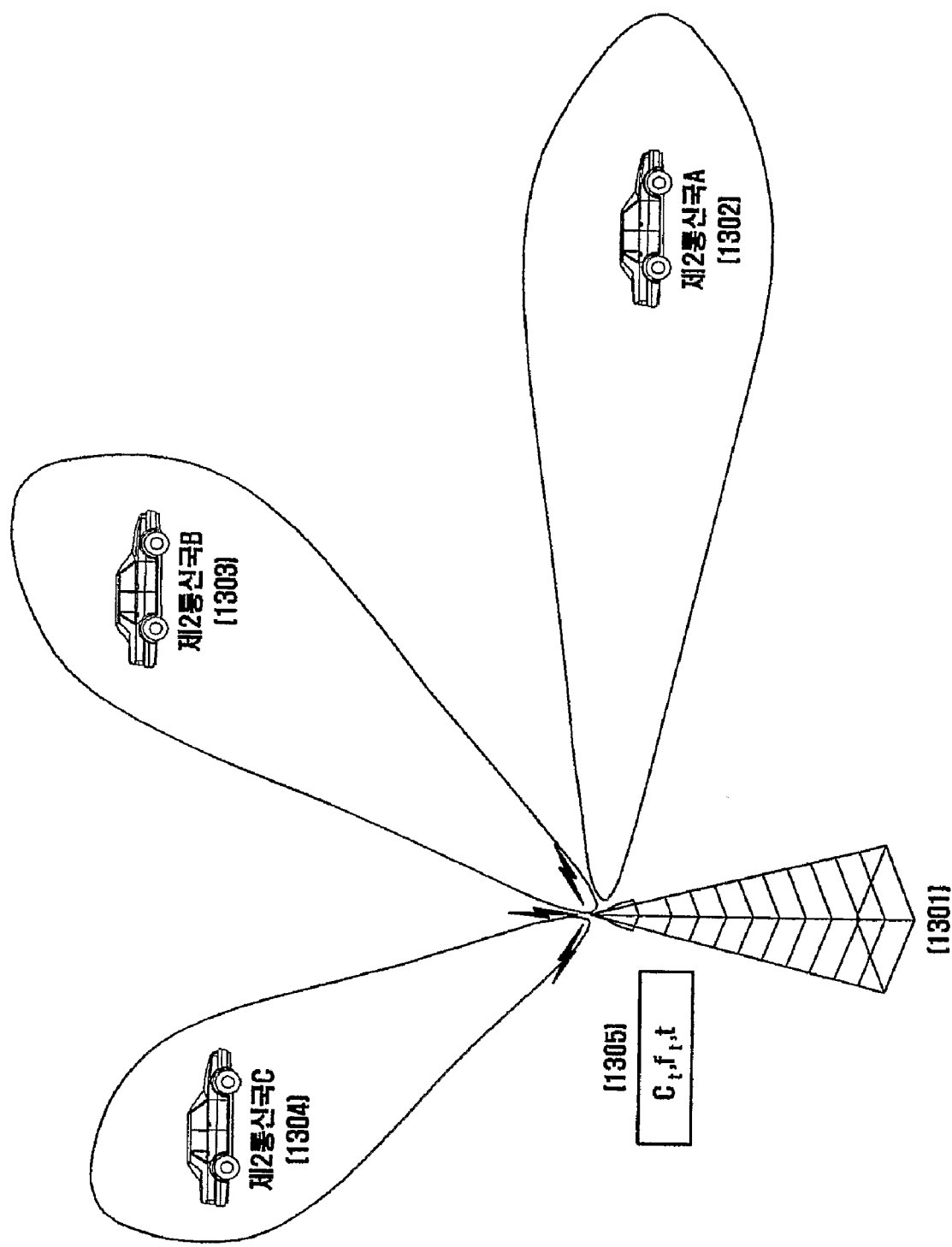
FIG. 13 is a diagram illustrating an example of a decrease in collisions between hopping patterns by beamforming for second communication stations.

Based on the beam-forming technique of the block diagram, respective signals transmitted through the physical antennas form beams through superposition of signals transmitted through different physical antennas over a radio channel. When a spatial filtering characteristic is used, in which transmission signals for individual data streams is spatially filtered using beams, the qualities of the respective received signals of the second communication stations can be improved, and the number of data symbol collisions in an arbitrary symbol interval, which occurs in the OFCHM method, can be reduced. FIG. 13 is a diagram illustrating an example of reducing the number of collisions among hopping patterns by forming beams for second communication stations. In an arbitrary transmission interval 't', a first communication station 1301 forms individual beams corresponding to second communication stations A, B and C 1302, 1303 and 1304. In the case where each of the second communication stations performs hopping using the same orthogonal codeword $C_t$ and subcarrier $f_t$, the signal of each of the second communication stations is received with a small amplitude by different second communication stations due to spatial blocking in a transmission beam, and does not affect each other at the time of symbol detection for each of the second communication stations in a receiver. Accordingly, in the situation of FIG. 13, symbol collisions in an arbitrary transmission interval 't' do not occur.

INDUSTRIAL APPLICABILITY

The present invention relates to a method of multiplexing a plurality of communication channels, and controlling spread, hopping and the assignment of radio resources at the time of multiplexing to implement an orthogonal frequency and code hopping multiplexing communication method based on an orthogonal frequency division multiplexing method, in a communication system in which a plurality of communication channels are temporally synchronized.

Particularly, the present invention relates to, in a communication system based on an orthogonal frequency division multiplexing method, having a plurality of second communication stations synchronized with the first communication station, 1) a method of a first communication station assigning orthogonal channels with subcarrier groups and orthogonal codewords to second communication stations and discriminating the assigned orthogonal channels using pseudo-random hopping patterns in orthogonal frequency and code hopping multiplexing, 2) a method of not transmitting a data symbol with a symbol collision during a corresponding symbol interval and applying a collision compensation method that increases the transmission power of all channels in order to compensate for partially lost data of all related channels in the case that multiple channels have a hopping pattern collision and the corresponding symbol value is not the same, 3) a method of adjusting a spreading method and a hopping method according to varying channel environments, distances, and relative velocities between the first and second communications, and 4) a method of combining and using a non-hopping (division) method and a hopping method according to the quality of service required by each channel when the hopping method is combined with a conventional non-hopping type division method and is then used, which can be utilized in mobile communication systems.

The invention claimed is:

1. An orthogonal frequency division multiplexing (OFDM)-based orthogonal frequency and code hopping multiplexing (OFCHM) communication method in a digital communication system comprising a first communication station and a second communication station, the digital communication system provided for efficient multiplexing of communication channels to the first and second communication stations, and multiplexing the communication channels, wherein the multiplexing comprises the steps of:

spreading at the first communication station, a data stream to be multiplexed and intended for transmission to the second communication station, based on a predetermined spreading factor;

arranging the data stream on one OFDM-based subcarrier along only a time axis; and multiplexing the spread data symbols to be transmitted to the second communication stations, wherein the said spread data symbols are assigned to the single subcarrier by hopping using only orthogonal codewords in the said spreading and assigning steps.

2. The OFCHM communication method of claim 1, further comprising the step of forming a transmission beam using a multi array antenna in accordance with locations of the respective second communication stations on a receiving side, with respect to the individual data streams multiplexed at the first communication station.

3. The OFCHM communication method of claim 2, wherein the forming of the transmission beam using the multi array antenna comprises selecting a beam area to which the second communication station belongs, from among pre-defined stationary transmission beam areas, in consideration of a location information of the second communication station, to thereby form a beam with respect to a corresponding transmission data stream.

4. The OFCHM communication method of claim 2, wherein the forming of the transmission beam using the multi array antenna comprises forming a dynamic beam to provide antenna gain with respect to a corresponding transmission data stream, in consideration of a location information of the second communication station.

5. An orthogonal frequency division multiplexing (OFDM)-based orthogonal frequency and code hopping multiplexing (OFCHM) communication method in a digital communication system comprising a first communication station and a second communication station, the digital communication system provided for efficient multiplexing of communication channels to the first and second communication stations, and multiplexing the communication channels, wherein the multiplexing comprises the steps of:

spreading at the first communication station, a data stream to be multiplexed and intended for transmission to the second communication station, based on a predetermined spreading factor;

arranging the data stream on one OFDM-based subcarrier along only a time axis; and multiplexing the spread data symbols to be transmitted to the second communication stations, wherein the said spread data symbols are assigned to the single subcarrier by hopping using both orthogonal subcarrier and orthogonal codeword in the said spreading and assigning steps.

6. An orthogonal frequency division multiplexing (OFDM)-based orthogonal frequency and code hopping multiplexing (OFCHM) communication method in a digital communication system comprising a first communication station and a second communication station, the digital communication system provided for efficient multiplexing of communication channels to the first and second communication stations, and multiplexing the communication channels, wherein the multiplexing comprises the steps of:

spreading at the first communication station, a data stream to be multiplexed and intended for transmission to the second communication station, based on a predetermined spreading factor;

arranging the data stream on a specific subcarrier group along a frequency axis only, within one OFDM symbol section; and multiplexing the spread data symbols to be transmitted to the second communication stations, wherein the said spread data symbols are assigned to the single subcarrier by hopping using only orthogonal codeword in the said spreading and assigning steps.

7. An orthogonal frequency division multiplexing (OFDM)-based orthogonal frequency and code hopping multiplexing (OFCHM) communication method in a digital communication system comprising a first communication station and a second communication station, the digital communication system provided for efficient multiplexing of communication channels to the first and second communication stations, and multiplexing the communication channels, wherein the multiplexing comprises the steps of:

spreading at the first communication station, a data stream to be multiplexed and intended for transmission to the second communication station, based on a predetermined spreading factor;

arranging the data stream on a specific subcarrier group along a frequency axis only, within one OFDM symbol section; and multiplexing the spread data symbols to be transmitted to the second communication stations, wherein the said spread data symbols are assigned to the single subcarrier by hopping using both orthogonal subcarrier and orthogonal codeword in the said spreading and assigning steps.

8. An orthogonal frequency division multiplexing (OFDM)-based orthogonal frequency and code hopping multiplexing (OFCHM) communication method in a digital communication system comprising a first communication station and a second communication station, the digital communication system provided for efficient multiplexing of communication channels to the first and second communication stations, and multiplexing the communication channels, wherein the multiplexing comprises the steps of:

spreading at the first communication station, a data stream to be multiplexed and intended for transmission to the second communication station, based on a predetermined spreading factor;

arranging the data stream on a specific subcarrier group along a time axis and a frequency axis, within a specific OFDM symbol section; and multiplexing the spread data symbols to be transmitted to the second communication stations, wherein the said spread data symbols are assigned to the single subcarrier by hopping using only orthogonal codeword in the said spreading and assigning steps.

9. An orthogonal frequency division multiplexing (OFDM)-based orthogonal frequency and code hopping multiplexing (OFCHM) communication method in a digital communication system comprising a first communication station and a second communication station, the digital communication system provided for efficient multiplexing of communication channels to the first and second communication stations, and multiplexing the communication channels, wherein the multiplexing comprises the steps of:

spreading at the first communication station, a data stream to be multiplexed and intended for transmission to the second communication station, based on a predetermined spreading factor;

arranging the data stream on a specific subcarrier group along a time axis and a frequency axis, within a specific OFDM symbol section; and multiplexing the spread data symbols to be transmitted to the second communication stations, wherein the said spread data symbols are assigned to the single subcarrier by hopping using both orthogonal subcarrier and orthogonal codeword in the said spreading and assigning steps.

* * * * *